J. S. BRAND.
MEANS FOR SIMULTANEOUSLY WRITING A PLURALITY OF SIGNATURES OR INSCRIPTIONS.
APPLICATION FILED JULY 2, 1908.

919,689.

Patented Apr. 27, 1909.

7 SHEETS—SHEET 1.

Witnesses

Inventor
J. S. Brand,
by F. Amos Johnson
Atty.

J. S. BRAND.
MEANS FOR SIMULTANEOUSLY WRITING A PLURALITY OF SIGNATURES OR INSCRIPTIONS.
APPLICATION FILED JULY 2, 1908.

919,689.

Patented Apr. 27, 1909.
7 SHEETS—SHEET 4.

Witnesses

Inventor,
J. S. Brand
by F. Amos Johnson
atty.

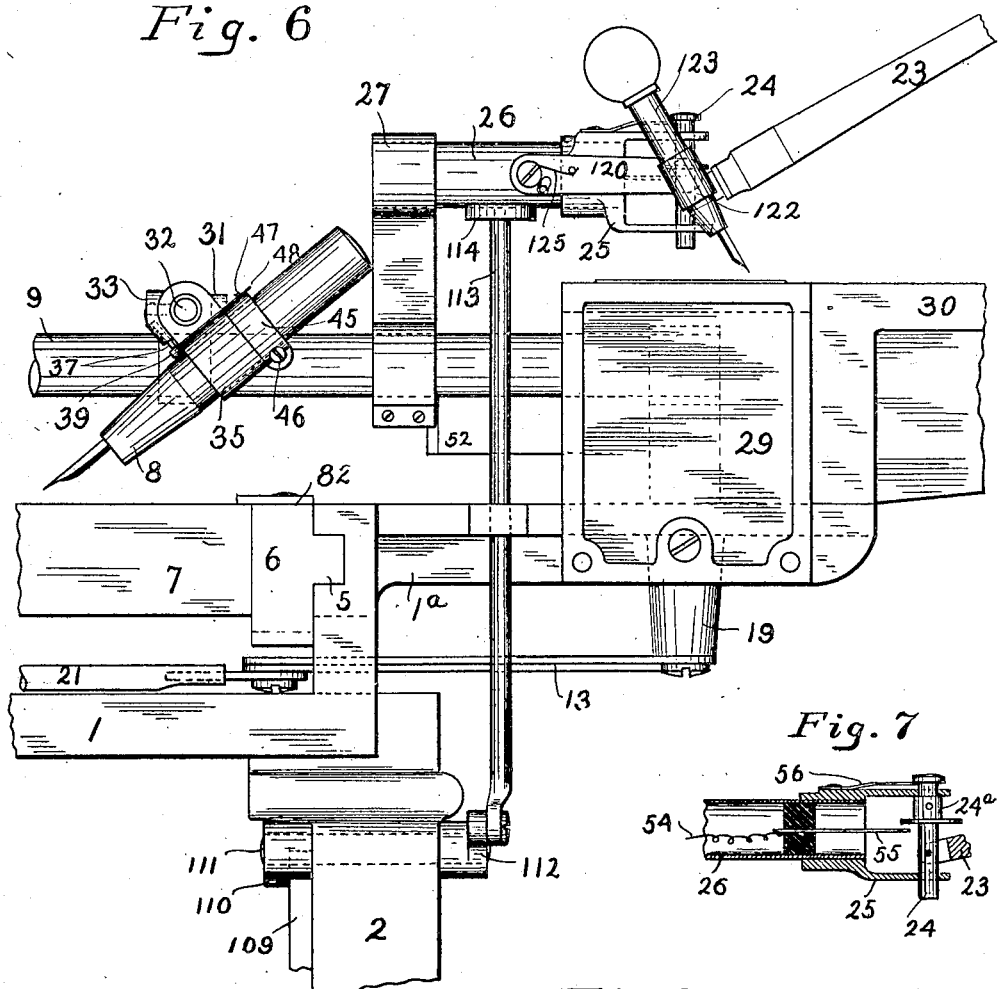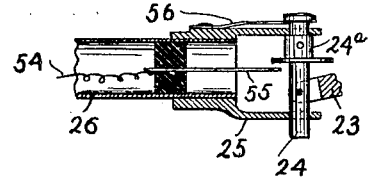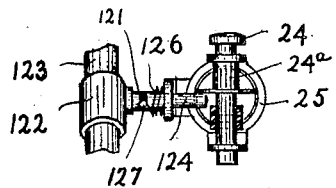

J. S. BRAND.
MEANS FOR SIMULTANEOUSLY WRITING A PLURALITY OF SIGNATURES OR INSCRIPTIONS.
APPLICATION FILED JULY 2, 1908.
919,689.
Patented Apr. 27, 1909.
7 SHEETS—SHEET 6.
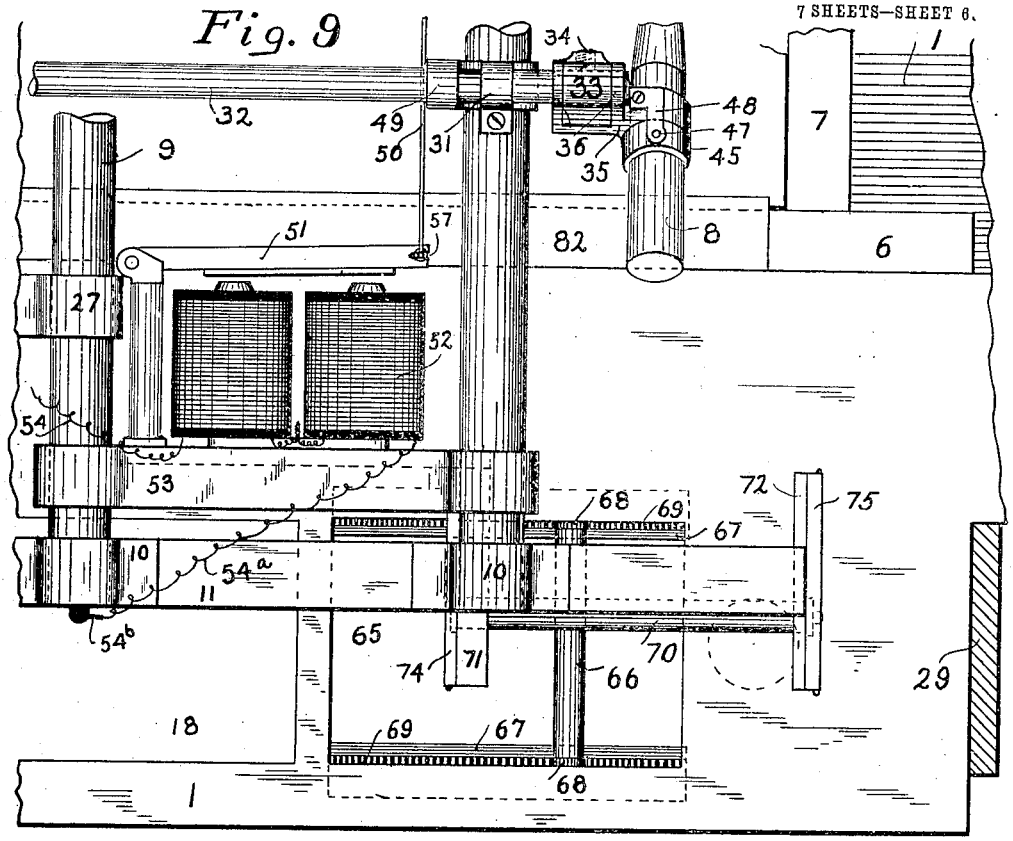
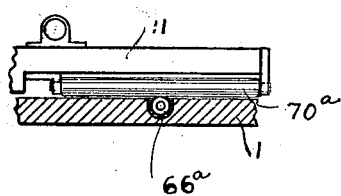
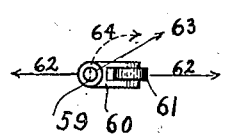
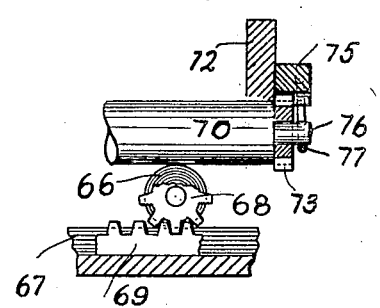
Witnesses
Fred Wheeler
Seth Johnson
Inventor
J. S. Brand,
by F. Amos Johnson
Atty.
THE NORRIS PETERS CO., WASHINGTON, D. C.

J. S. BRAND.
MEANS FOR SIMULTANEOUSLY WRITING A PLURALITY OF SIGNATURES OR INSCRIPTIONS.
APPLICATION FILED JULY 2, 1908.
919,689.
Patented Apr. 27, 1909.
7 SHEETS—SHEET 7.
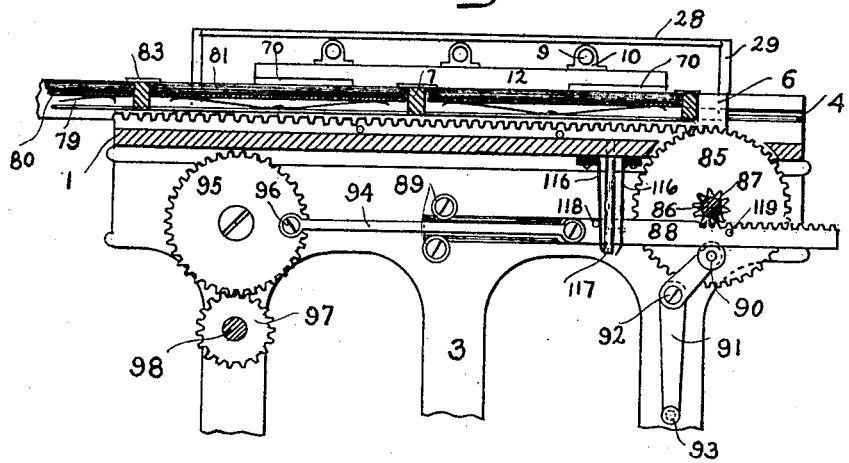
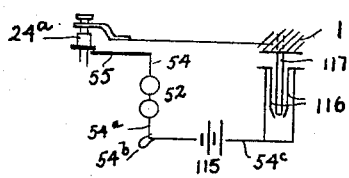
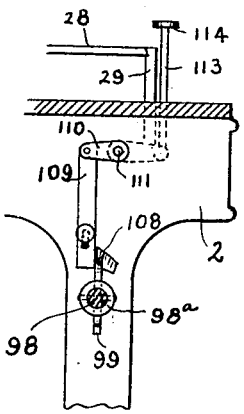
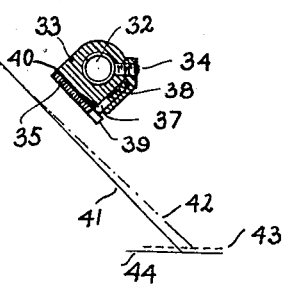
Witnesses
Inventor,
J. S. Brand,
by F. Amos Johnson
atty.

UNITED STATES PATENT OFFICE.

JOHN S. BRAND, OF FAIRHAVEN, MASSACHUSETTS, ASSIGNOR TO SIGNATURE COMPANY, OF NEW YORK, N. Y., A CORPORATION OF NEW YORK.

MEANS FOR SIMULTANEOUSLY WRITING A PLURALITY OF SIGNATURES OR INSCRIPTIONS.

No. 919,689.    Specification of Letters Patent.    Patented April 27, 1909.

Application filed July 2, 1908. Serial No. 441,566.

*To all whom it may concern:*

Be it known that I, JOHN S. BRAND, a citizen of the United States, and a resident of Fairhaven, in the county of Bristol, State of Massachusetts, have invented certain new and useful Improvements in Means for Simultaneously Writing a Plurality of Signatures or Inscriptions, of which the following is a specification.
My invention relates to improvements upon the type of machines set forth in U. S. Patent No. 863,351, of date August 13, 1907. Machines of this class have a pantographic frame or carriage, on which are mounted a plurality of pens—say ten or twenty. This carriage is guided by a pilot handle with which a person may write as with an ordinary penholder, to produce ten or twenty signatures at once—the action of the pens to and from the paper being controlled by a magnetic device.

My invention embodies an improved means for holding and mounting the pens; an improved anti-friction device for supporting the pen carriage; an improved method of holding the papers or documents to be signed and bringing them into and out of writing position; a safety device, whereby it is impossible to bring the pens into writing position while the documents are being shifted; a pen for making a temporary or fleeting copy to guide the operator.

Other features of improvements will be referred to in the specification and pointed out in the claims.

Figure 1:
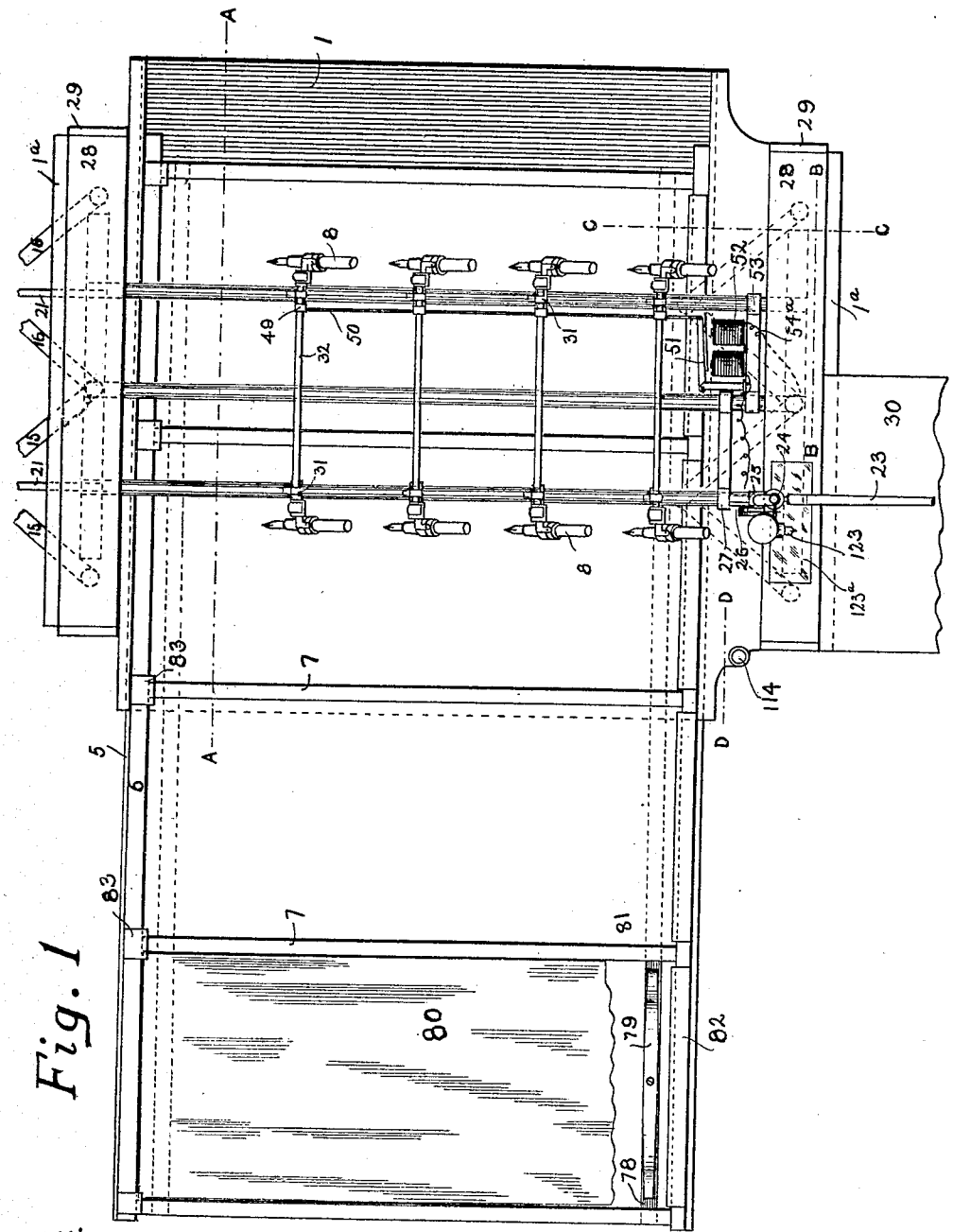
Figure 2:
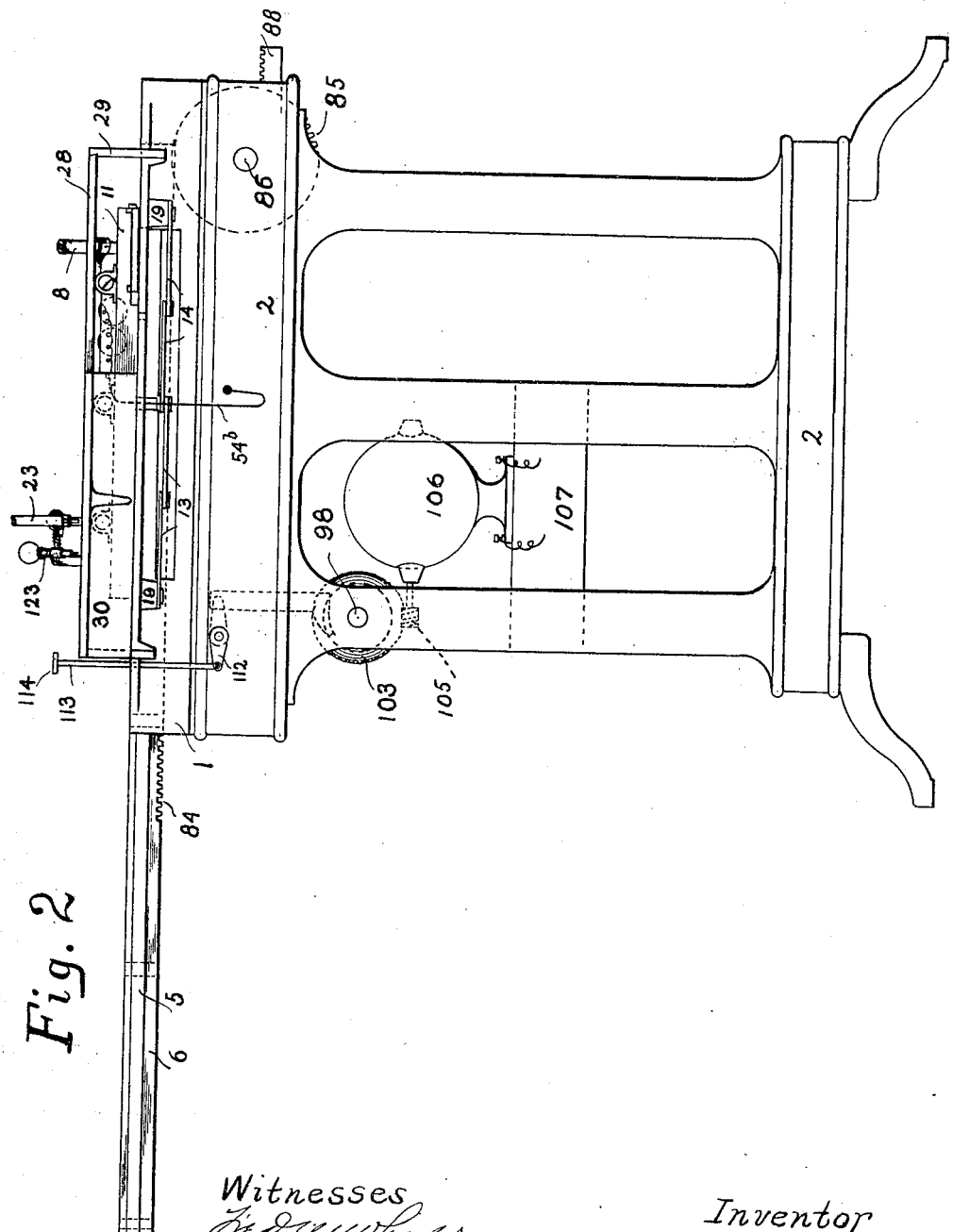
Figure 3:
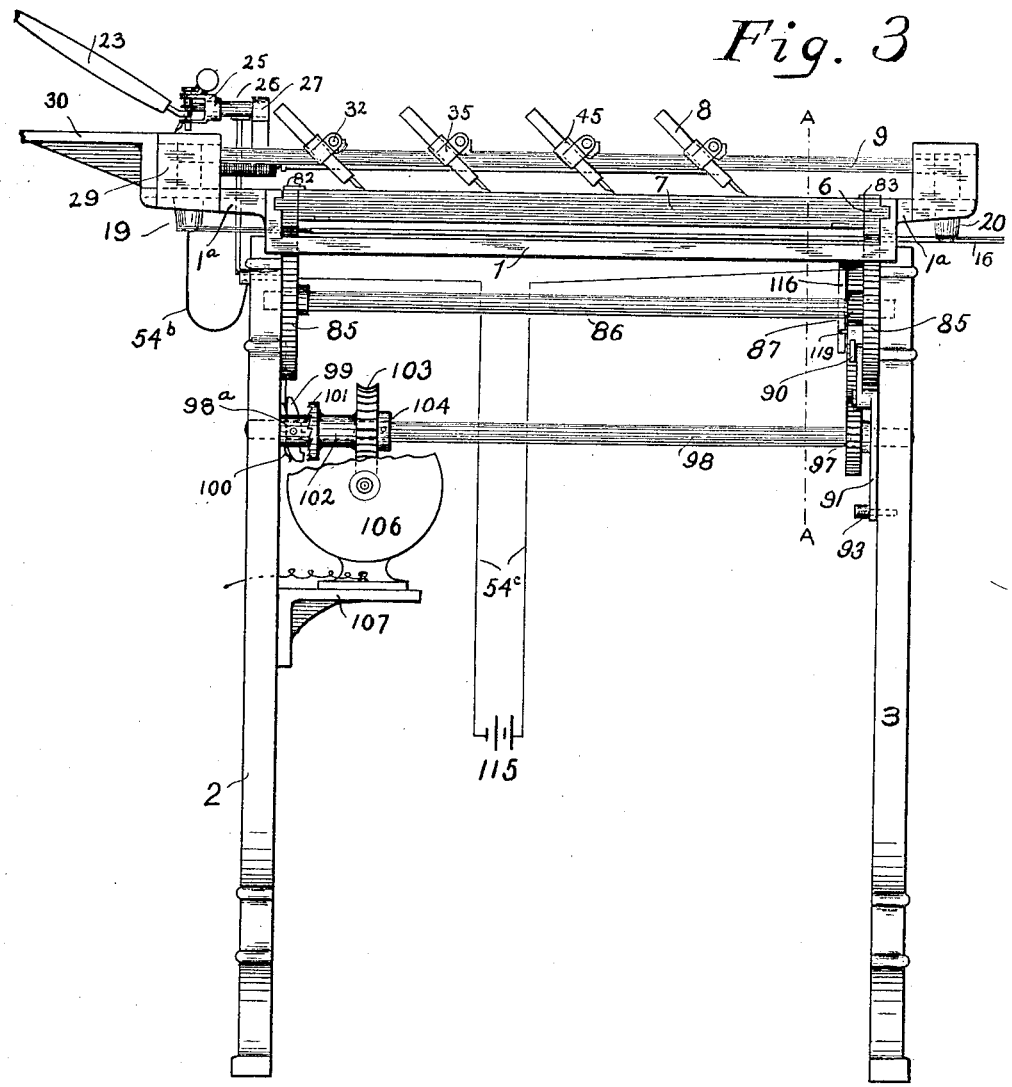
Figure 4:
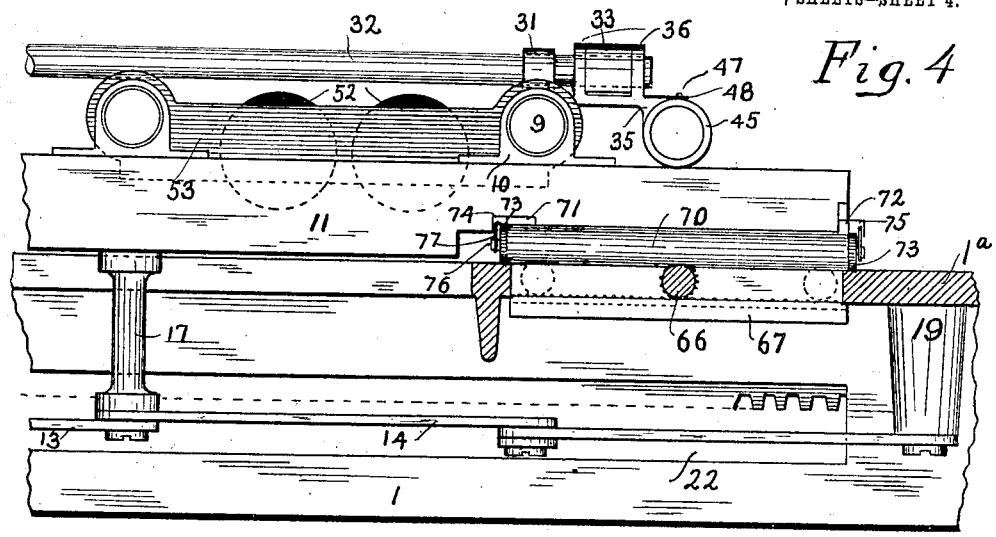
Figure 5:
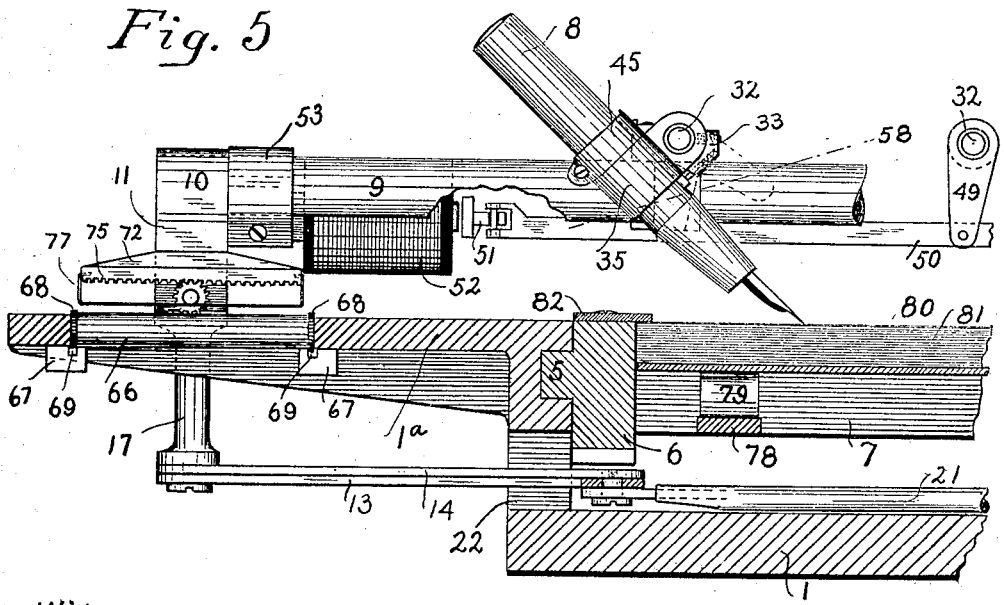

In the following description reference is made to the accompanying drawings, in which:

Figure 1 is a plan view of my improved machine; Fig. 2 is a front elevation; Fig. 3 is a right elevation; Fig. 4 is a front sectional elevation, about on line B—B of Fig. 1 and Fig. 5 is a right sectional elevation, about on line C—C of Fig. 1 the bridge plate being omitted from both views; Fig. 6 is a left elevation of a portion of the machine, showing the pilot pen, one of the writing pens and some of the contiguous parts; Fig. 7 is a vertical section showing an electrical contact and Fig. 8 is a front elevation of the same parts, also showing the means of holding the pilot pen; Fig. 9 is a plan of a small portion of the machine, showing the electromagnet, the anti-friction rolls and other parts; Figs. 10 and 11 show alternative constructions of anti-friction devices; Fig. 12 is an enlarged view of part of one of the pairs of anti-friction rolls; Fig. 13 is a front sectional elevation about on line A—A of Figs. 1 and 2;
Fig. 14 is a diagram showing electrical connections; Fig. 15 is a detail section on line D—D of Fig. 1; Fig. 16 is a detail section showing means of attaching the pen sockets to their shafts.

The main framework of the machine consists of a bed plate 1, which is mounted upon front and rear legs 2 and 3 respectively. The bed is channel shaped, as shown in Fig. 3 and has front and rear marginal flanges 1ª.
It incloses a frame or carriage in which are placed the papers or documents to be signed—grooves 4 being made to receive tongues 5 of the side rails, or racks 6 of the carriage. Cross pieces 7 hold the rails of the carriage together and divide it into compartments, as will be more fully explained. Above the bed is the pen carriage—a skeleton frame which carries the writing members 8, which may be pens, pencils or any suitable markers—eight fountain pens being shown in the drawings. The pen carriage is composed of three longitudinal tubes 9, preferably of aluminum or other light metal, which are secured by brackets 10 to front and rear transverse cross pieces 11 and 12 respectively. The pen carriage is held to a universal movement in a horizontal plane by four pairs of pantographic links 13, 14, 15 and 16—the cross pieces of the carriage being pivoted to the links by studs 17, which project downward through suitable openings 18 in the marginal flanges 1ª of the bed. These openings are of sufficient area to permit of the necessary movement of the pen carriage. One link of each pair 13 and 14 is pivoted to lugs 19 on the under side of the front marginal flange of the bed and one link of each pair 15 and 16 is pivoted to lugs 20 at the rear. Connecting rods 21 join the pair 13 to the pair 15 and the pair 14 to the pair 16. Openings 22 are made in the vertical side portions of the bed for the links 13 and 14 and the connecting rods 21. The pen carriage is guided by a pilot handle 23, which is pivoted to a pilot pin 24. This pin is mounted for a slight vertical movement in a head or yoke piece 25 which is connected by a short tube 26 to an elbow bracket 27 which is secured to two of the tubes 9 of the carriage. The cross pieces 11 and 12 of the pen carriage move under bridge plates 28, which are secured by means of clips or brackets 29 to the front and rear flanges 1ª of the bed. An arm rest 30 is secured to the front marginal flange of the bed.

*Pen mounting.*—It is to this feature that some of my improvements specially relate. When the pens are mounted rigid with the pen shafts, as shown in the patent referred to, they have to be very accurately adjusted and the writing surfaces must be absolutely flat—conditions which are very difficult to attain—or else the writing is uneven and at times some of the pens will not mark at all.

To obviate this difficulty I connect the pens to their shafts by yielding connections, which permit the pens to adjust themselves to a slight unevenness in the writing surfaces.

The outside rails 9 of the pen carriage have adjustable journal brackets 31 for transverse tubular pen shafts 32—four shafts being shown. On these shafts are adjustable collars 33, of shape shown in Fig. 16, which are secured to the shafts in any desired positions by means of set screws 34. The pens 8 are held in swinging sockets 35, which have yoke portions 36 inclosing the collars 33 on the pen shafts. The collars 33 have plungers 37 which are urged by springs 38 against lugs 39 of the pen sockets 35, so as to hold the pen sockets against flattened portions 40 of the collars 33. From this construction it will be seen that, as the pen shafts are rocked, the pens will move with the shafts until the pen points reach the writing surfaces and if these writing surfaces happen to be a little uneven, the pens will adapt themselves to the uneven surfaces. In Fig. 16 the line 41 shows a low position of a pen and the line 42 shows a high position—the normal position of the writing surface being about midway between the lines 43 and 44.

When there are a large number of pens in the machine, the matter of putting them in place and adjusting them becomes an important matter. I have provided a means whereby any pen, when once put in place and adjusted, can be almost instantly removed and quickly put back into place and proper adjustment. I do this in the following manner: Around each of the pens I place a band 45 which is secured by a clamp screw 46 and which has a pin 47. Secured to each socket piece 35 is a spring 48, the outer or free end of which has a hole adapted to engage one of the pins 47 of the pen bands. The pens have a free sliding and turning fit in their sockets. From this construction it will be seen that the pens may first be adjusted any distance into the sockets and given any roll desired and when the band is securely clamped around the pen, it may be released by simply raising the spring 48 off its pin 47 and taken out of the machine. It is also evident that it can be quickly and accurately put back into the same place and adjustment that it was before it was removed, thus saving much time and annoyance.

In addition to making the pens easily removable and again insertible I have secured a construction which permits the pens to be rocked into a position in which the points are above a horizontal, so that the ink will not run out if the machine is left standing for some time. This saves frequently taking the pens out of the machine. The pen shafts are rocked to bring the pens into writing position by an electro-magnet, the circuit of which is closed on depressing the pilot pin. Pivoted to each pen shaft 32 is an arm 49. These arms extend downward and are connected by a link 50. The forward end of the link engages the free end of an armature lever 51 of an electro-magnet 52 which is secured to a spanner bracket 53 which bracket extends between two of the rails 9 of the pen carriage. One of the wires 54 from the magnet terminates in a contact spring 55 (Fig. 7) which is suitably insulated from and extends forward from the tube 26. The pilot pin 24 has a metallic collar 24ª and, through the pen carriage, is in electrical communication with the plate 1. The other wire 54ª joins a flexible cord 54ᵇ which extends downward through the central openings 18 in the bed and through the leg 2—the cord being long enough to permit of any desired movement of the carriage—thence it runs to a battery or other source of electrical current and finally terminates in the bed plate, as will be more fully pointed out later. The pilot pin is normally held up by a spring 56. On depressing the pilot handle, a current will be closed through the magnet and the pens brought into writing position. I have made the link 50 flexible and it is pivotally secured to the armature lever 51 by entering a notch 57 in said lever. By swinging the link out of engagement with its lever, the shafts 32 may be rocked so that the arms 49 will assume the upper dotted position shown in Fig. 5 and the pens will stand in the position indicated by dotted line 58—that is, with the pen point above the horizontal. Pens may be left in this position for hours or even days and still be ready for immediate use when wanted; or they may be capped in this position and left indefinitely.

*Pen carriage support.*—Another important feature of my invention consists in an improved anti-friction support for the pen carriage. Where there are a large number of pens in the machine, it is of the utmost importance that the friction of the pen carriage on its supporting bed be reduced to a minimum and that it be rendered as inert as possible. The ball friction support shown in the patent referred to is not durable; nor has it an easy movement. Attempts have been made to render the movements of the carriage easy by a suspensatory spring; but this method is unsatisfactory. A commercial machine, which has been in use for some time, is provided with casters, which turn in ball bearings; but this method is objectionable on account of the tendency of the carriage to creep or crawl, as may be seen by reference to Fig. 11. The stems 59 of four casters 60, which are mounted in the corners of the pen carriage, have rolls 61. If the carriage is moved in the directions indicated by the double headed arrow 62, it is easily moved and there is no tendency to crawl. If, however, an attempt is made to move the carriage in the direction of the arrow 63, the friction of the rolls 61 on the bed makes a fulcrum or pivotal point out of the point of contact and causes the carriage to tend to move in the direction of the curved arrow 64. To obviate this tendency to creep or crawl I provide a double or compound anti-friction device—one element of which permits of movement in one direction and the other element permits of movement in a direction at right angles thereto, or substantially so. Both elements may work singly or in conjunction, so that a free and easy universal movement of the carriage in a horizontal plane is obtained. I accomplish this by interposing pairs of horizontal rolls between the carriage and the bed. Four pairs are preferable—one at each corner of the carriage. In the drawings I have shown one pair only—that of the forward and right hand side of the carriage.

Adjacent to and on each side of the openings 18 in the bed, already pointed out, are rectangular openings 65. Spanning these openings and extending from front to rear are rolls 66 which are supported on suitable bearing pieces or rails 67, which form a trackway on which the rolls may travel. The rolls 66 have at each end a pinion 68, the pitch diameter of which is equal to the diameter of the rolls which construction causes the rolls to turn without sliding and thereby producing friction. The track pieces 67 are grooved out to receive racks 69 which are placed in such a position and at such a depth that the gears will properly mesh therewith when the rolls 66 are in position on the trackways. This construction causes the rolls to have a parallel rolling movement and they are held at all times in a position at right angles to the trackway. The pen carriage is provided with similar rolls 70; bearing pieces 71 and 72; pinions 73; racks 74 and 75—arranged as shown in Fig. 9, so that the rolls of the carriage are at right angles to the rolls 66 of the bed. The rolls 70 have tenons 76 which are inclosed by retaining yokes 77 in order to hold the rolls in place when the carriage is lifted from the machine. The rolls 70 which directly support the pen carriage rest upon the rolls 66 of the bed. From this construction it will be seen that, as the carriage is moved to the right or left, the rolls 66 will travel in the same direction on their trackway half the distance and as the carriage is moved forward or rearward the rolls 70 will travel in the same direction on their trackway half that distance, and that these movements can take place simultaneously or in succession. This, as already stated, gives a very easy movement and one without any tendency of the carriage to creep.

Fig. 10 shows an alternative construction in which $66^a$ and $70^a$ represent a pair of rolls which turn in fixed bearings in the bed and pen carriage. While this overcomes the tendency of the carriage to creep, the construction is otherwise objectionable. The friction of the rolls in their bearings is greater than the rolling friction and it is evident that the rolls would need to be twice as long to permit of a like movement of the carriage as they would in the construction first explained, where the rolls traveled on their trackways.

*Paper carriage.*—Another and very important feature of my present invention consists in a new and improved method of holding the papers or documents to be signed. Heretofore, in a few commercial machines that have been in use, the documents to be signed have been put up in temporary binders. These were fed through the machine by turning a hand crank. The cost of the binders is considerable and there is a good deal of time lost in putting the papers into them. I now do away with the binders altogether and pads, packages or bundles of the papers to be signed are placed in compartments of a reciprocating carriage. The bottoms of these compartments are spring seated and tend to urge the papers upward against suitable marginal stops. I have shown a carrier with four compartments—two of which may be brought into writing position at a time. The checks, bonds stock certificates or other documents which are exposed in two of the compartments, having been signed, a starting key is touched. This calls into action an electric motor or other source of power to automatically shift the carriage bringing the other two compartments into writing position. While in this position the two signed papers are removed. This is easily accomplished by pressing down on the package of papers near one corner and grasping the top sheet between the thumb and fingers. As the signed sheets are removed, fresh sheets are brought into place. The operation is continued as long as there are any documents left in any of the compartments. The construction to accomplish this is as follows: The rails 6 and cross pieces 7 of the paper carriage have already been pointed out. Extending across the compartments and attached to the partitions 7 and parallel with the racks 5 are two strips 78. On the upper surface of these strips are bow springs 79 and on the outer and upward extending ends of these springs are the movable bottoms 80 on which are placed packages of documents or papers 81 to be signed. The springs 79 urge the papers upward and hold the uppermost sheet against front and rear marginal stops 82 and 83.

On the under edge of the rails 5 are cut rack teeth 84 which engage gears 85 of a shaft 86 which extends between and is journaled in the legs 2 and 3. By turning the shaft 86 it will be seen that the paper carriage can be moved to the right or left as desired. This movement is accomplished in the following manner: On the shaft 86, close to its rear gear 85, is a pinion 87, which engages, on its under side, a rack 88 (see Fig. 13). The rack is guided near its left end between two rolls 89 and at its right end it is supported by a roll 90 which is on the upper arm of an angular lever 91, which lever is pivoted at 92 to the rear leg 3 and the lower arm of which is secured by a pin 93. A connecting link 94 joins the rack 88 to a gear and crank disk 95. The throw of the crank pin 96 is such and the proportioning of the gearing is made so that a half revolution of the crank disk will shift the paper carriage from one of its positions to the other, as already explained. By removing the pin 93 and turning the lever 91, the rack 88 may be disengaged from its gear and the paper carriage adjusted so as to bring the signatures at any desired position on the documents—as at the left, middle or right. The upper roll 89 is placed a little to the right of the lower one so as to permit the rack 88 to be disengaged.

The crank disk 95 is given a half turn when desired by means of a gear 97 which has just half the number of teeth as the disk and gear 95. This gear is keyed or pinned to an intermittently running shaft 98, which is journaled in the legs 2 and 3. This shaft has an enlarged portion 98$^a$ just inside the front leg and in it is pivoted a clutch pawl 99 which is urged by a spring 100 to seek engagement with the teeth of a clutch 101. The clutch is carried by a sleeve 102 which is secured to or is integral with a worm gear 103 and is loosely mounted on the shaft 98—being held between the enlarged portion 98$^a$ and a collar 104. The gear is kept constantly rotating by means of a worm 105 which may be driven by an electric motor 106 which is mounted on a bracket 107 on the inside of leg 2. Normally the clutch pawl is kept out of engagement by a stop wedge 108 which is carried by a sliding bar 109, to the upper end of which is pivoted an arm 110. This arm is connected by a short shaft 111 through leg 2 to another arm 112 to which arm is pivoted the key stem 113 of a starting key 114. When one set of signatures has been made this starting key is depressed, thereby releasing the clutch pawl and permitting the shaft 86 to make one revolution, when it will be stopped by the wedge 108 and bar 109 intercepting the clutch pawl. The wedge portion 108, which withdraws the clutch pawl 99, is thinner than the bar 109; so that the lower end of said bar forms a stop for said pawl and thereby prevents the shaft being carried farther by its momentum. This revolution of the shaft 86 causes the crank disk to make a half revolution and shifts the paper carriage, as already explained.

*Safety device.*—In order to prevent the pens being accidentally brought into writing position during the shifting of the paper carriage I arrange a circuit breaking device which opens the circuit just as the carriage starts and closes it again just as the carriage reaches its full movement. The electric circuit was traced from the magnet as far as the flexible cord 54$^b$. From this point a wire 54$^c$ runs to a battery 115, thence to a pair of insulated contact springs 116 which are on the under side of the bed and adjacent to the rack 88. Between these springs there is a metallic post 117, against which the springs are alternately pressed by pins 118 and 119 in the rack 88, when said rack is at rest in either of its stopped positions. As soon as the rack starts to move to shift the paper carriage, the pressure against one of the springs is removed and the spring leaves the post 117 thereby opening the circuit and making it impossible for the magnet 52 to be energized until the paper carriage has come to rest in its shifted position.

*Pilot pen.*—In order that users of the machine may see what they are doing I provide a guide or pilot pen in a position where the eyes would naturally fall—that is, adjacent to the pilot pen. This pen may contain ink, the same as the writing pens of the machine and a writing surface of paper provided for it. This would necessitate the providing of some means of holding the paper and, furthermore, many users of the machine object to having useless autographic signatures made. To overcome these objections I provide a means of making a fleeting, transitory or evanescent copy of the signatures. This may be done in various ways. As a preferred form I use a pilot pen with a non-absorbent writing surface—such as ground glass—and a colorless or transparent, volatile writing fluid—such as water, or water to which has been added a little alcohol. See Figs. 6 and 8. On the left side of the pilot head 25 I pivot an arm 120 the front end of which carries a horizontal sleeve 121. In this sleeve I place a socket 122 which carries the pilot pen 123. A stem 124 of the socket extends through the sleeve and is held upward against the metallic collar 24ª of the pilot pen by reason of a spring 125 acting on the arm 120. A spring 126 around the sleeve 121, acts against a pin 127 in the stem of the pen socket—the pin loosely fitting in a hole in the sleeve—and gives a yielding connection to the pen (quite similar to the way the writing pens are seated), as it is brought down on its writing surface 123ª, which is preferably of ground glass. Writing, with such a pen and using water, or water and alcohol, is clearly visible on ground glass temporarily, but evaporates quickly; so that one signature after another may be written without any difficulty being experienced.

In the following claims I use the term "pen-carriage" as a convenient term to cover the carriage or frame which carries the writing members—whether they be pens, pencils or other forms of markers.

I claim:

1. A pen-carriage; a plurality of markers; adjustable bands for said markers, in combination with sockets for the markers—said sockets being mounted on the carriage and the marker bands being removably secured to the sockets.

2. A pen-carriage; a plurality of markers; adjustable bands for said markers, in combination with sockets for said markers mounted on the carriage—the sockets and bands being joined by spring-seated couplings, whereby the markers may be removed and replaced in the same adjustment.

3. A supporting bed having a plurality of horizontal rolls, in combination with a pen-carriage having a corresponding plurality of horizontal rolls—the rolls of the carriage being at right angles to and resting upon the rolls of the bed, whereby said carriage is supported and permitted to have a free and universal movement in a horizontal plane.

4. A supporting bed having a plurality of traveling rolls, in combination with a pen-carriage having a corresponding plurality of traveling rolls—the rolls of the carriage being at right angles to and resting upon the rolls of the bed.

5. A bed having a plurality of traveling anti-friction rolls; track-ways for said rolls; means for holding the rolls to parallel movement on their track-ways; in combination with a pen-carriage having a corresponding plurality of rolls at right angles to and resting upon the rolls of the bed and likewise provided with track-ways and means for holding them to a parallel movement thereon.

6. The combination with a pen-carriage, of a supporting bed and a plurality of pairs of anti-friction rolls interposed between the bed and the carriage—the rolls of each set being at right angles to each other; track-ways for all the rolls and means for maintaining the same relative angular position of the track-ways and rolls.

7. The combination with a pen-carriage, of a supporting bed and a plurality of interposed pairs of anti-friction rolls—the rolls of each pair being at right angles to each other; a track-way for each roll; a pinion on each end of said rolls; stationary racks adapted to mesh with said pinions to secure a parallel movement of each roll on its trackway.

8. The combination with a bed, of a pen-carriage and a plurality of interposed pairs of anti-friction rolls—the rolls of each pair being at right angles to each other; track-ways for said rolls; rack-and-pinion devices for holding the rolls to parallel movement on the trackways—the pitch diameter of each pinion being the same as the diameter of its roll.

9. The combination with plural writing devices of a reciprocating paper carrier—said carrier being divided into compartments; spring-seated bottoms in said compartments adapted to support packages of documents; marginal stops for said documents and power-driven mechanism adapted to be called into action to alternately bring the papers into and out of writing position.

10. The combination with plural writing devices of a reciprocating paper carrier—said carrier being divided into compartments; spring-seated bottoms in said compartments adapted to support packages of documents; marginal stops for said documents; a power-driven mechanism adapted to bring the papers into and out of writing position; and hand-controlled means for bringing the power mechanism into action.

11. In a machine of the class described, a reciprocating paper carriage adapted to bring papers into and out of writing position; an intermittently running crank disk; means for giving said crank disk a half revolution only and connections from said crank disk to the carriage, whereby said carriage is alternately shifted.

12. In a machine of the class described, a reciprocating paper carriage adapted to bring papers into and out of writing position; an intermittently running crank disk; means for giving said crank disk a half revolution only; adjustable connections from the crank disk to the carriage whereby said carriage is reciprocated and its position varied.

13. In a machine of the class described, a reciprocating paper carriage adapted to bring papers into and out of writing position; a shaft, carrying a clutch pawl; a power-driven clutch member adapted to engage the pawl and revolve the shaft; a starting key and connections therefrom to secure the engagement of the pawl and clutch; a stop device adapted to stop the movement of the shaft when it has made one revolution; a gear on said shaft which meshes with a geared crank disk having double the number of teeth and connections from said crank disk to the carriage to reciprocate the same.

14. In a machine of the class described, the combination with a plurality of writing members or markers, of series or groups of documents; means for bringing said groups of documents into writing position and means for preventing the markers being normally brought into action until the documents are in place.

15. In a machine of the class described, the combination with a plurality of simultaneously writing members or markers, of series or groups of documents; a conveyer for said documents adapted to bring them into and out of writing position; means for preventing the markers being normally brought into action during the movement of said conveyer.

16. In a machine of the class described, the combination with a plurality of markers, of groups of documents; means for bringing said documents into and out of writing position; an electro-magnetic device adapted to bring all the markers into writing position; an electric circuit for the magnetic device and means for preventing the normal closing of the circuit during the shifting of the documents, whereby the action of the writing members is blocked during the shifting of the papers.

17. In a machine of the class described, the combination with a plurality of simultaneously operated markers, of groups of documents; a reciprocating carrier therefor adapted to bring the documents alternately into and out of writing position; an electro-magnetic device adapted to bring the markers into writing position; an electric circuit for the magnetic device; a reciprocating rack adapted to reciprocate the paper carriage; connections from said rack to break the electric circuit during the shifting of the carriage and to close said break at the completion of the carriage movement.

18. In a machine of the class described, means for holding documents; a plurality of markers; means for writing a corresponding plurality of signatures with said markers on said documents; in combination with a pilot pen and a non-absorbent writing surface therefor—said pilot pen being provided with a colorless, volatile writing fluid, whereby a fleeting or evanescent copy of the signatures is produced.

In testimony whereof I affix my signature in presence of two witnesses.

JOHN S. BRAND.

Witnesses:
  H. F. STODDER,
  HOWARD HORTON.